(12) United States Patent
Kessler et al.

(10) Patent No.: US 9,501,243 B2
(45) Date of Patent: Nov. 22, 2016

(54) METHOD AND APPARATUS FOR SUPPORTING WIDE OPERATIONS USING ATOMIC SEQUENCES

(71) Applicant: Cavium, Inc., San Jose, CA (US)

(72) Inventors: Richard E. Kessler, Northborough, MA (US); Michael S. Bertone, Marlborough, MA (US); Christopher J. Comis, Framingham, MA (US)

(73) Assignee: Cavium, Inc., San Jose, CA (US)

( * ) Notice: Subject to any disclaimer, the term of this patent is extended or adjusted under 35 U.S.C. 154(b) by 178 days.

(21) Appl. No.: 14/045,602

(22) Filed: Oct. 3, 2013

(65) Prior Publication Data

US 2015/0100747 A1 Apr. 9, 2015

(51) Int. Cl.
*G06F 12/00* (2006.01)
*G06F 3/06* (2006.01)
*G06F 9/30* (2006.01)

(52) U.S. Cl.
CPC ............ *G06F 3/0656* (2013.01); *G06F 3/0614* (2013.01); *G06F 3/0671* (2013.01); *G06F 9/3004* (2013.01); *G06F 9/30072* (2013.01)

(58) Field of Classification Search
CPC .. G06F 3/0656; G06F 3/0671; G06F 3/0614; G06F 9/30072; G06F 9/3004
See application file for complete search history.

(56) References Cited

U.S. PATENT DOCUMENTS

| | | |
|---|---|---|
| 6,112,282 A | 8/2000 | Lynch |
| 6,615,340 B1 | 9/2003 | Wilmot |
| 7,937,419 B2 | 5/2011 | Ylonen |
| 8,578,380 B1 | 11/2013 | Adams |
| 2005/0010743 A1 | 1/2005 | Tremblay |
| 2008/0010284 A1* | 1/2008 | Beck .............................. 707/8 |
| 2009/0327372 A1 | 12/2009 | Ylonen |
| 2013/0254488 A1 | 9/2013 | Kaxiras |
| 2014/0282558 A1 | 9/2014 | Brooker |
| 2015/0100737 A1 | 4/2015 | Kessler et al. |

* cited by examiner

*Primary Examiner* — John Lane
(74) *Attorney, Agent, or Firm* — Hamilton, Brook, Smith & Reynolds, P.C.

(57) ABSTRACT

Implementations of wide atomic sequences are achieved by augmenting a load operation designed to initiate an atomic sequence and augmenting a conditional storing operation that typically terminates the atomic sequence. The augmented load operation is designed to further allocate a memory buffer besides initiating the atomic sequence. The conditional storing operation is augmented to check the allocated memory buffer for any data stored therein. If one or more data words are detected in the memory buffer, the conditional storing operation stores the detected data word (s) and another word provided as operand in a concatenation of memory locations. The achieved wide atomic sequences enable the hardware system to support wide memory operations and wide operations in general.

22 Claims, 3 Drawing Sheets

METHOD AND APPARATUS FOR SUPPORTING WIDE OPERATIONS USING ATOMIC SEQUENCES

BACKGROUND

In hardware systems, atomic sequences are designed to enable execution of a sequence of instructions uninterrupted. As such, atomic sequences provide a framework for executing a sequence of instructions while ensuring that the memory space associated with the sequence of instructions is not accessed or modified by any other instruction or operation.

SUMMARY

Atomic sequences provide a tool for executing a sequence of instructions uninterrupted. By augmenting a load operation designed to initiate an atomic sequence and augmenting a conditional storing operation that terminates the atomic sequence, implementations of wide atomic sequences, in a hardware system, are achieved. The achieved wide atomic sequences enable the hardware system to support wide memory operations and wide operations in general.

According to at least one example embodiment, a method and corresponding apparatus for implementing a wide atomic sequence in a processor include initiating an atomic sequence by executing an operation, or instruction, designed to initiate the atomic sequence and allocate a memory buffer. One or more data words are then stored in a concatenation of one or more contiguous, or noncontiguous, memory locations by executing a conditional storing operation. The conditional storing operation is designed, to automatically check the memory buffer allocated for any data stored therein. The conditional storing operation stores the one or more data words based on a result of checking the memory buffer.

According to at least one example implementation of the wide atomic sequence, the operation designed to initiate the atomic sequence, when executed, loads a data word based, for example, on a corresponding memory location, or address, provided as operand. In addition, at least one regular load operation is executed within the atomic sequence resulting in at least one other data word being loaded. Data may also be stored in the allocated memory buffer by executing one or more regular storing operations within the atomic sequence. As such, when executing the conditional storing operation, data stored in the memory buffer and a data word, provided as operand to the conditional storing operation, are stored in a concatenation of two or more contiguous or noncontiguous memory locations, the concatenation of the two or more memory locations, as well as the data and the data word stored therein, have a cumulative width greater than a data word width associated with the processor. The data stored in the memory buffer may represent one or more outputs of one or more first instances of a base operation and the data word, provided as operand to the conditional storing operation, may represent an output of a second instance of the base operation. In such case, the data and the data word, stored in the concatenation of the two or more memory locations, represent an output of a wide base operation corresponding to the base operation. The one or more first instances of the base operation and the second instance of the base operation are executed within the atomic sequence.

According to at least one other example implementation, the operation, or instruction, designed to initiate the atomic sequence has as destination register a memory register storing a static value. As such, the instruction designed to initiate the atomic sequence does not actually load data when executed. Data is stored in the allocated memory buffer by executing one or more regular storing operations within the atomic sequence. Data stored in the allocated memory buffer is detected by the conditional storing operation. One or more first data words detected to be stored in the memory buffer and a second data word, provided as operand to the conditional storing operation, are stored in a concatenation of two or more contiguous or noncontiguous memory locations, the one or more first data words and the second data word having a cumulative width greater than a data word width associated with the processor. The one or more first data words, detected to be stored in the memory buffer, may represent one or more outputs of one or more first instances of a base operation and the second data word may represent an output of a second instance of the base operation. As such, the one or more first data words and the second data word as stored in the concatenation of the two or more memory locations represent an output of a wide base operation corresponding to the base operation. The one or more first instances of the base operation and the second instance of the base operation are executed prior to initiating the atomic sequence.

According to at least one example embodiment, the operation designed to initiate the atomic sequence and any regular load operation(s) executed within the atomic sequence operate on memory locations residing within a single memory line. Also regular storing operation(s), executed within the atomic sequence, and the augmented conditional storing operation operate on memory locations residing within a single memory line.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
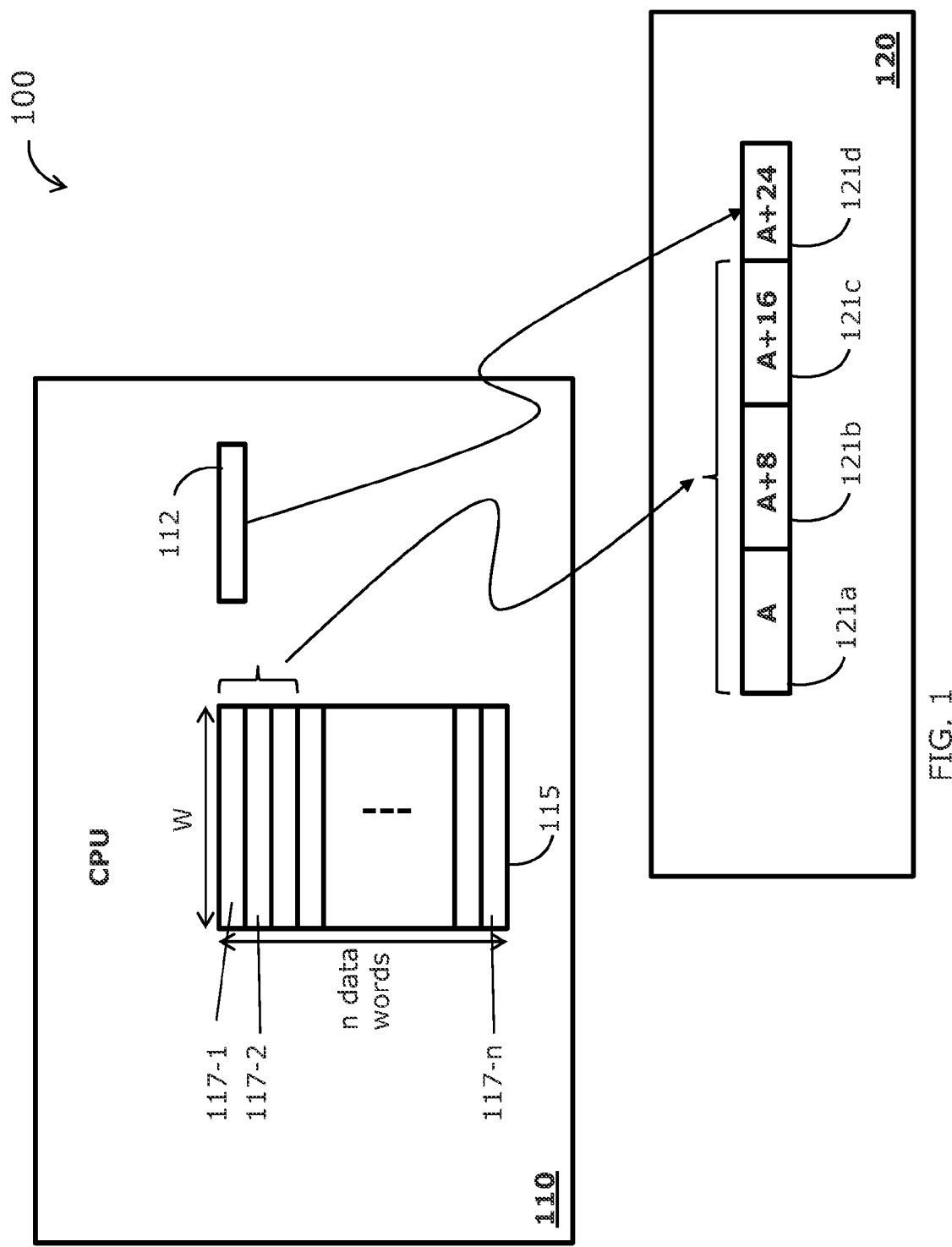
FIG. 1 is a block diagram of a hardware system 100 illustrating attachment of the memory buffer to the augmented load operation designed to initiate an atomic operation and the conditional storing operation, according to at least one example embodiment.

A description of example embodiments of the invention follows.

In some microprocessors, registers, address buses, and data buses have fixed width, e.g., 32 bits or 64 bits. As such, any memory access operation, logic operation, or any other operation is usually restricted by the fixed width. That is, all memory addresses, integers, and data words supported by the microprocessors have a size or width equal to the same fixed width. The fixed width of the registers, address buses, and data buses for a given microprocessor are referred to hereinafter as the data word width for the same microprocessor. Some other microprocessors may also support memory operations that are wider than a corresponding data word width. For example, some 64-bit processors may support 128-bit memory operations but they do not support 256-bit memory operations. That is, such processors may support limited wide memory operations, e.g., memory operations with width equal to twice the corresponding data word width, but not wider memory operations.

The data word width for a given microprocessor presents a restriction on what atomic memory operations may be performed by the same microprocessor and any computer architecture associated with the microprocessor.

According to at least one example embodiment, atomic sequences are employed to enable a processor to support wide memory access, and other, operations. In other words, at least one implementation of an atomic sequence provides a framework to enable a given processor to support memory access, and other, operations that are wider than the data word width associated with the same processor. For example, a processor supporting 64-bit computing may be enabled to handle 128-bit or 256-bit atomic memory operations by using existing 64-bit instructions and augmenting the capabilities of supported atomic sequences.

An atomic sequence enables defining an un-interruptible sequence of instructions, or operations. In other words, once an atomic sequence is initiated, all the corresponding instructions are executed before any other instruction may be allowed to execute. As such, atomic sequences provide a framework for executing a sequence of instructions while ensuring that the memory space associated with the sequence of instructions is not accessed or modified by any other instruction or operation.

The instruction sequence below represents an atomic sequence using the MIPS64 instruction set.

```
Label:
    LLD $5, 0($6)
    DADDIU $5, $5, 1
    SCD $5, 0($6)
    BEQ $5, $0, Label
    NOP
```

The atomic sequence shown above is an example of a sequence of instructions to atomically add one to a memory address. The memory address has a 64-bit width. The memory address is assumed to be initially stored in register $6. The Load Linked Doubleword (LLD) instruction is a load instruction, in the MIPS64 instruction set, designed to initiate an atomic sequence when executed. The LLD instruction also loads the 64-bit memory location into register $5 from register $6. The Doubleword Add Immediate Unsigned (DADDIU) instruction adds 1 to the memory address now stored in register $5.

The Store Conditional Doubleword (SCD) instruction is a conditional storing instruction which is typically indicative of the last instruction in the atomic sequence and is designed to store a data word. In the example above, the SCD either updates the 64-bit memory address in register $6 with the content of register $5 and deposits 1 into register $5 indicating successful storage, or simply deposits 0 into register $5 indicating a storage failure. The Branch on EQual (BEQ) is a branch instruction that checks whether the SCD instruction executed successfully, e.g., successful storage, and causes the atomic sequence to be repeated if a failure of the SCD instruction is detected. Specifically, the BEQ compares the content of register $5 to zero. Note that register $0 always reads as zero. If the content of register $5 is equal to zero, e.g., the SCD failed to store the data word, the BEQ directs execution to Label, therefore, causing the atomic sequence to be initiated again by the LLD instruction. If the content of register $5 is not equal to zero, e.g., the SCD succeeded to store the data word, the branch is not taken, and execution continues to any instructions following the atomic sequence. The No Operation (NOP) instruction, shown at the end of the example MIPS64 code presented above, does nothing.

While instructions such as the LLD and SCD are specific to the MIPS64 architecture, equivalent operations exist, or may exist, in other processor architectures. A person skilled in the art should appreciate that embodiments presented herein are not restricted to the MIPS64 architecture, but are rather applicable to other architectures. In the following, an instruction that initiates an atomic sequence, e.g., the LLD instruction in MIPS64, but not necessarily restricted to the MIPS64 architecture is referred to as an operation, or instruction, designed to initiate an atomic sequence. According to at least one example embodiment, such instruction may or may not be a load operation. Also, an instruction for conditionally storing data, e.g., the SCD instruction in MIPS64, but not necessarily restricted to the MIPS64 architecture is referred to as a conditional storing operation, or instruction. A regular load operation refers herein to a load operation, e.g., equivalent to a Load Doubleword (LD) operation in the MIPS64 architecture, which simply loads a data word. A regular storing operation refers herein to a storing operation, e.g., equivalent to a Store Doubleword (SD) operation in the MIPS64 architecture, which simply stores a data word.

According to at least one example embodiment, the hardware implementation of the operation designed to initiate an atomic sequence is augmented to further allocate, besides initiating an atomic sequence, a memory buffer, or "write buffer." In other words, executing the augmented operation designed to initiate an atomic sequence includes initiating the atomic sequence and allocating the memory buffer. In addition, the hardware implementation of the conditional storing operation is augmented to further check the allocated memory buffer for any data stored therein. If any data is detected in the memory buffer, the detected data and a data word are stored in a concatenation of two or more contiguous or noncontiguous memory locations; otherwise the data word is stored in a memory location. By augmenting, in a given processor architecture, the load operation designed to initiate an atomic sequence and the conditional storing operation, the atomic sequence with the augmented operations enables the processor to support wide memory operations. A person skilled in the art should appreciate that, in a given processor architecture, instead of augmenting existing operations, the operation designed to initiate an atomic sequence and allocate a memory buffer may be implemented as a new instruction in the architecture. Similarly, the conditional storing operation designed to check the allocated memory buffer may be implemented as a new instruction in a given hardware architecture.

FIG. 1 is a block diagram of a hardware system 100 illustrating attachment of the memory buffer to the operation designed to initiate an atomic operation and the conditional storing operation, according to at least one example embodiment. The hardware system 100 includes a processing unit 110 and a memory component 120. In executing the augmented load operation designed to initiate the atomic sequence, the processing unit 110 initiates the atomic sequence and allocates the memory buffer 115. For example, in the OCTEON processor, available from Cavium Inc., the memory buffer 115 may be allocated within the write buffer. However, a person skilled in the art should appreciate that the memory buffer 115 may be allocated in a similar way or differently in other processors, for example, within the level one (L1) data cache.

According to an example implementation, initiating the atomic sequence includes setting a "lock flag" indicating that an atomic sequence is active, or being executed. A load operation designed to initiate an atomic sequence usually starts a new atomic sequence, even if there is another active atomic sequence previously initiated. Starting the new atomic sequence destroys any prior active atomic sequence. According to at least one aspect, allocating the memory buffer 115 includes clearing the memory buffer 115 each time a load operation designed to initiate an atomic sequence is executed.

According to at least one example implementation, the memory buffer 115 includes n buffer entries, e.g., 117-1-117-n, where n is an integer. Each buffer entry has a size equal to the data word width, i.e., W, associated with the hardware system 100. For example, if the data word width W associated with the hardware system 100 is equal to 64 bits, then each memory buffer entries, e.g., 117-1, 117-2, . . . , or 117-n, is 64 bits wide. Each line of the memory buffer 115 may correspond to a single memory buffer entry. That is, each line of the memory buffer 115 has a width equal to W. Alternatively, each line of the memory buffer 115 may have a width equal to twice, three times, or m times the data word width W, where m is an integer. According to yet another implementation, each line of the memory buffer 115 may be of a size not necessarily a multiple of W.

The conditional storing operation, e.g., SCD in MIPS64, usually stores a data word in a memory location and terminates the atomic sequence. A register 112 holding the data word is typically provided as input operand to the conditional storing operation. According to at least one example embodiment, the augmented conditional storing operation checks the memory buffer for any data stored therein. If one or more data words are detected to be stored in the memory buffer 115, the conditional storing operation stores the one or more detected data words and one other data word, e.g., the data word from register 112, in a concatenation of two or more memory locations, e.g., 121a-121d. The concatenation of two or more memory locations may be contiguous or noncontiguous. However, if no data is detected to be stored in the memory buffer 115, the conditional storing operation simply stores the data word provided as operand to the conditional storing operation, e.g., data word from register 112, in a specified memory location, e.g., 121d, and terminates the atomic sequence.

The atomic sequence ends when the corresponding conditional storing operation executes. For example, if the "lock flag" is still held when the conditional storing operation issues, the data word provided as operand to the conditional storing operation and any data found in the memory buffer 115, if any, are successfully written to memory. However, if the "lock flag" is off, or cleared, when the conditional storing operation issues, the data word and any data in the memory buffer 115 fail to be stored in the memory. The conditional storing operation, e.g., SCD in MIPS64, returns success/fail indication of the atomic sequence, for example, based on the "lock flag" value. According to an example implementation, one or more data words may be stored in the memory buffer 115 within the atomic sequence through regular storing operations. When the atomic sequence succeeds, the one or more data words in the memory buffer 115 are written to memory together with the data word provided as operand for the conditional storing operation, e.g., provided in register 112. According to at least one example implementation, the one or more data words in the memory buffer 115 and the data word provided as operand for the conditional storing operation, e.g., from register 112, are stored in a concatenation of two or more contiguous memory locations. Alternative, the one or more data words in the memory buffer 115 and the data word provided as operand for the conditional storing operation, e.g., from register 112, may be stored in the memory according to a different scheme, e.g., two or more noncontiguous memory locations.

In typical atomic sequences, no regular load or regular storing operations are employed within the atomic sequence. According to at least one example implementation, in an atomic sequence with augmented, or new, operation designed to initiate an atomic sequence and augmented, or new, conditional storing operation, regular load operation(s) or regular storing operation(s) may be employed within the atomic sequence.

Figure 2:
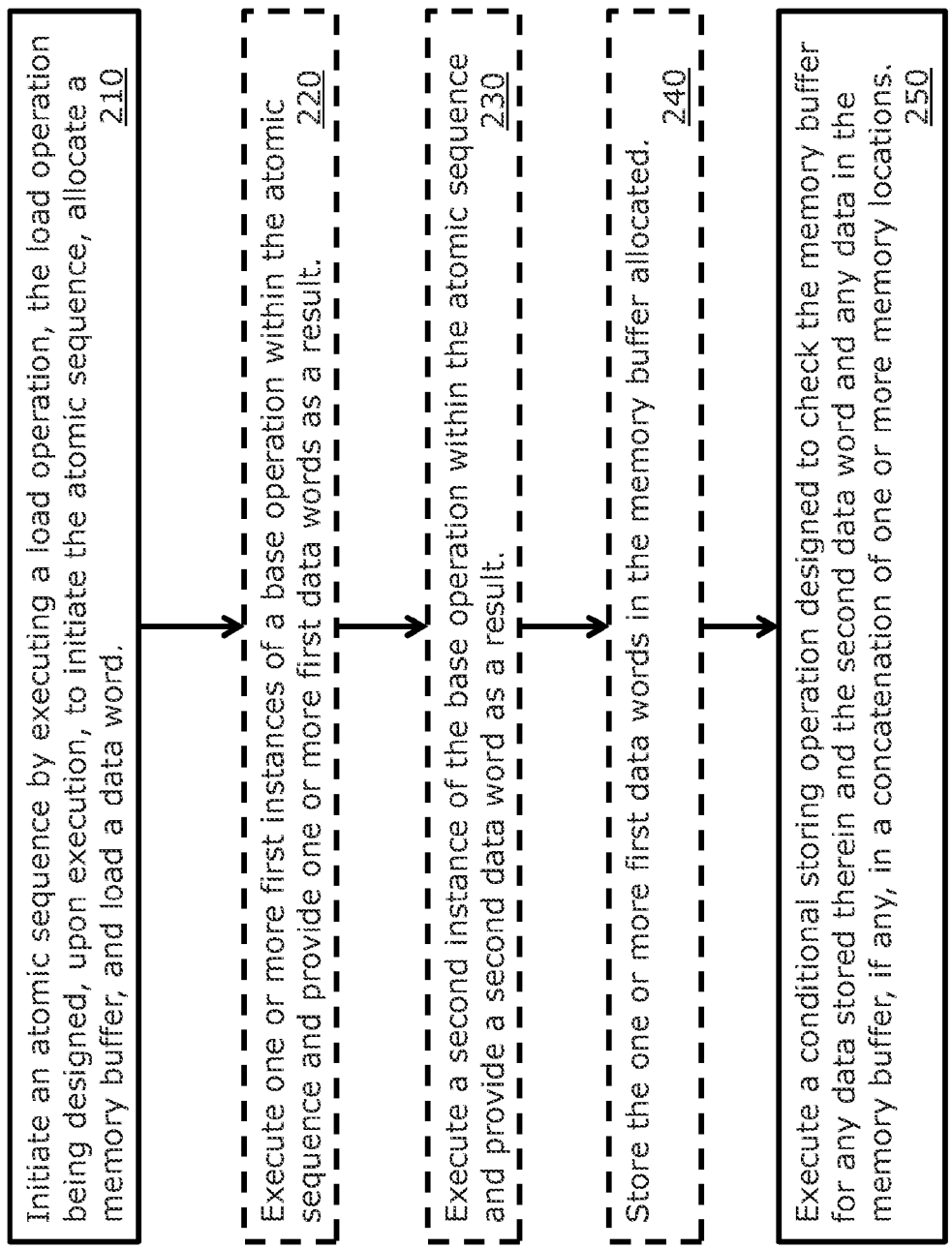
FIG. 2 is a flowchart illustrating a method of enabling a processor device to support wide memory operations, according to at least one example embodiment.

FIG. 2 is a flowchart illustrating a method 200 of enabling a processor device to support wide memory operations, according to at least one example embodiment. At block 210, an atomic sequence is initiated by executing a load operation designed to initiate an atomic sequence. Besides initiation the atomic sequence, the load operation designed to initiate the atomic sequence also loads a data word based on a corresponding operand indicative of a register or memory location. According to at least one example embodiment, the load operation designed to initiate the atomic sequence is further designed to allocate a memory buffer 115 when executed. The memory buffer 115 may be allocated, for example, in a cache memory associated with the processing unit 110. Allocating the memory buffer 115 includes clearing any content within the memory buffer 115 each time an atomic sequence is initiated.

Within the initiated atomic sequence one or more regular load operations and/or one or more regular storing operations are performed (not shown in FIG. 2). For example, one or more data words are loaded using regular load operations within the initiated atomic sequence. At block 240, one or more data words may be stored in the allocated memory buffer 115 using regular storing operations within the initiated atomic sequence. For example, the one or more data words stored in the allocated memory buffer 115 may represent one or more results of one or more first instances of a base operation performed in block 220. Base operations include logic operations, e.g., OR, XOR, AND, or the like, mathematical operations, or any other operations supported by the processing unit 110. In storing the one or more data words in the allocated memory buffer 115, a number of least significant (LS) bits within each address of the one or more data words may be used to determine one or more locations within the memory buffer for storing the one or more data words. For example, if the memory buffer 115 has a capacity to store a total of 128 bytes, then the least seven significant bits each address of the one or more data words may be used to indicate the bytes to be written in the memory buffer 115. Alternatively, if the if the memory buffer 115 has a capacity to store a total of 256 bytes, then the least eight significant bits in each address of the one or more data words may be used to indicate the bytes to be written in the memory buffer 115. A person skilled in the art should appreciate that a different approach for assigning locations within the allocated memory buffer to store data words therein may be employed.

At block 250, the atomic sequence is terminated by executing an augmented conditional storing operation. The augmented conditional storing operation takes an indication of a register, e.g., 112, or memory address associated with a data word as an operand and is configured to store the corresponding data word in a memory location specified, e.g., also provided in a second operand of the augmented conditional storing operation. The data word may represent, for example, an output of a second instance of the base operation performed in block 230. The augmented conditional storing operation is configured to check the allocated memory buffer 115, or specific portions of the allocated memory buffer 115, for any data stored therein. For example, if within the atomic sequence one or more regular storing operations were performed, e.g., as indicated in block 240, then one or more corresponding data words are already stored in the allocated memory buffer 115.

The blocks 220 and 230 in FIG. 2 are optional. In other words, instances of base operations may or may not be performed within the atomic sequence. Also, the storing operation in block 240 may or may not be performed.

Upon detecting one or more data words stored within the memory buffer 115 the one or more data words detected and the data word, with corresponding address provided as operand to the conditional storing operation, are stored in two or more memory locations, e.g., 121a-121d. If no data is detected within the allocated memory buffer, then only the data word, with corresponding address provided as operand to the augmented conditional storing operation, is stored in a specified memory location. The atomic sequence is terminated once the augmented conditional storing operation executes successfully.

The atomic sequence fails, e.g., no data word(s) is written to memory, if any of the bytes accessed by any operation in the atomic sequence, including the load operation initiating the atomic sequence and/or regular load operation(s), has a different value from when the load operation initiating the atomic sequence issued. The hardware system 100 may also fail the atomic sequence when another core writes the cache line, or writes a K-bit naturally-aligned word accessed the atomic sequence. The K-bit naturally aligned word refers to a wide word, with width equal to K, accessed by the atomic sequence to perform a wide atomic memory operation. For example, in a 64-bit architecture, K may be 128, 256, or the like. The term naturally-aligned indicates that the K-bit word is within a single memory line. According to at least one example embodiment, the K-bit word sampled, or a copy is maintained, when corresponding load operation(s) are executed. When the conditional storing operation is executed, the K-bit word in the memory is compared to the maintained copy to determine whether another core processor modified the K-bit word in the memory.

An atomic sequence succeeds if the load operations, including the load operation initiating the atomic sequence and/or regular load operation(s), and the storing operations, e.g., any regular storing operations and the conditional storing operation, in the atomic sequence appear to have executed atomically in memory. According to at least one example implementation, an atomic sequence that includes any regular storing operation that stores data in a write-through L1 data cache, invalidates the corresponding cache block from the data cache upon the conditional storing operation succeeding or failing at the end of the atomic sequence.

The instruction sequence below represents an atomic sequence, using the MIPS64 instruction set, for implementing a 128-bit XOR operation in a hardware system supporting 64-bit computing:

```
// assume $1 contains the address of the first 64-bit
// word of two 64-bit words forming a
// naturally- aligned 128-bit word
// assume $2, $3 contain two 64-bit words values to be
// XOR-ed with the combination of the two 64-bit data
// words
    $4 <- $1 & 0x7F     // 0x7f: the seven least
// significant bits of the address of the first word
// to indicate a location within the memory buffer,
// the memory buffer has a total size equal to 128
// bytes
AGAIN:
    LLD $5, 0($1)
    LD $6, 8($1)
    XOR $7, $2, $5
    XOR $8, $3, $6
    SD $7, CONSTANT($4)
    SCD $8, 8($1)
    BEQ $8, AGAIN
    NOP
    // $5, $6 contain the "fetch" value
```

First, the augmented LLD instruction initiates the atomic sequence, allocates the memory buffer 115, and loads the first 64-bit word, with address in register $1, into register $5. The regular load instruction (LD) then loads the second 64-bit word in register $6. If the address of the first word is A, then the address of the second word is A +8. The first 64-bit word and the second 64-bit word form together a 128-bit naturally aligned word. That is, the two 64-bit words are located in two consecutive memory locations within the same memory line. A first 64-bit XOR operation is performed on the contents of the registers $2 and $5 and a corresponding first 64-bit result is put in register $7. A second 64-bit XOR operation is performed on the contents of the registers $3 and $6 and a corresponding second 64-bit result is put in register $8. The result in register $7 is then stored, using the regular storing instruction SD, in the allocated memory buffer 115. In storing the first result in the allocated memory buffer 115, the value of CONSTANT+ ($4) indicates the address of a buffer entry within the memory buffer 115 in which the first result is to be stored. The parameter CONSTANT is a constant. The value in register $4 corresponds to the seven least significant (LS) bits of the memory address of the first 64-bit word, i.e., $4<-$1 & 0x7F. A person skilled in the art should appreciate that the addresses within the memory buffer 115 may be defined differently.

The processing unit 110 atomically samples the entire 128-bit naturally-aligned word, i.e., the combination of the two 64-bit words, at the time of the LLD issue. In this case K=128. The processing unit 110 then fails the terminating SCD if (a) any LD or LLD instruction in the atomic sequence got a result inconsistent with this sample, or (b) the memory value of any byte that was loaded differs from the sample at the time the sequence is resolved.

When the terminating SCD instruction succeeds, the second result, e.g., $8, provided as first operand to the terminating SCD instruction is written to the memory address A+8 indicated by the second operand, e.g., 8($1), of the SCD instruction. Also, the first result stored in the memory buffer 115 using the regular storing instruction SD is written to the memory address A, e.g., ($1). The value in the register $4 represents an address offset indicates to the hardware, e.g., processing unit 110, the memory address A, e.g., A or ($1), where the data stored in the allocated memory buffer 115 is to be written in the memory. In other words it determines a memory offset between the memory address, e.g., 8+$1, provided as operand to the SCD instruction and the memory location where the data word in the memory buffer is to be stored when the SCD is executed. In other words, if multiple words are to be stored in memory when executing the conditional storing operation, the address offset indicates the offset between address values, in the memory, associated with the multiple words.

Let X be the 128-bit word representing the combination of the first and second 64-bit words loaded using the LLD and LD instructions, and Y be the 128-bit representing the combination of the contents of registers $2 and $3. The combination of the first result and the second results, stored in by the SCD in the memory addresses A and A+8, is a 128-bit word representing the result of 128-bit XOR operation with corresponding operands X and Y. Therefore, the atomic sequence shown above using the MIPS64 instruction set is an example implementation of a 128-bit XOR operation, based on augmented LLD and SCD instructions, using 64-bit computing hardware. A person skilled in the art should appreciate that another base operation, other than XOR, may be used. Alternatively, a different atomic sequence, with the augmented LLD and SCD instructions but no base operations, may be employed to implement a wide memory operation such as a read or write operations. Also, a person skilled in the art should also appreciate that a different instruct set, other than MIPS64, may be used to implement wide operations within other architectures.

The atomic sequence with augmented load operation designed to initiate an atomic sequence and augmented conditional storing operation is referred to herein after as a wide atomic sequence.

Figure 3:
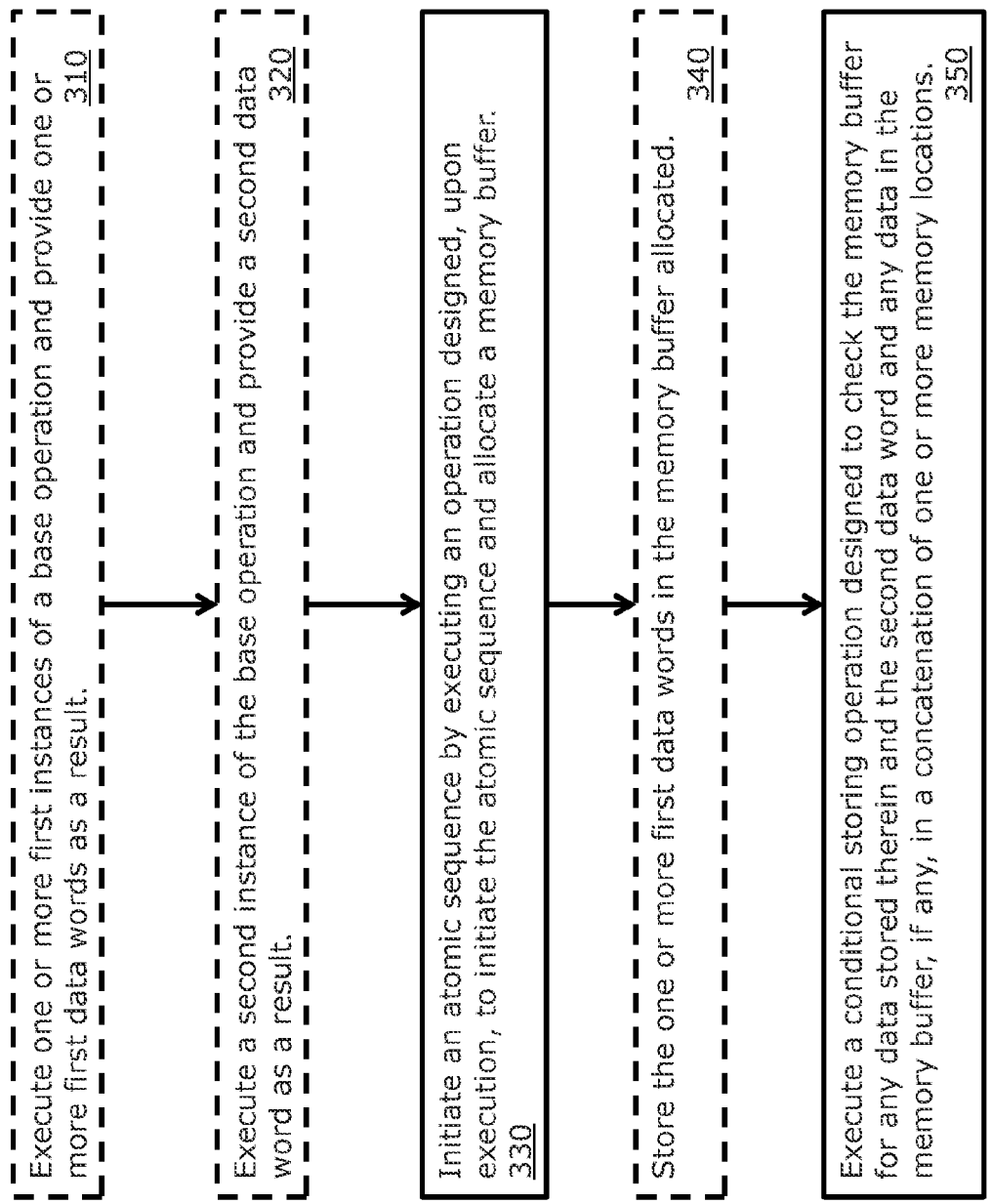
FIG. 3 is a flowchart illustrating a method of enabling a processor device to support wide memory operations, according to at least one other example embodiment.

FIG. 3 is a flowchart illustrating a method of enabling a processor device to support wide memory operations, according to at least one other example embodiment. At block 330, an atomic sequence is initiated by executing an operation, or instruction, that is designed, upon execution, to initiate the atomic sequence and allocate a memory buffer 115. In this case, the operation designed to initiate the atomic sequence has a register, e.g., register $0, carrying a static value, e.g., zero, as destination. In other words, the main functions of the augmented operation, designed to initiate the atomic sequence, are initiating the atomic sequence and allocating the memory buffer 115 without loading a data word. At block 340, one or more first data words may be stored in the allocated memory buffer 115 using one or more regular storing operations. The store operation(s) of block 340 may be optional. The one or more first data words may represent one or more results of one or more first instances of a base operation performed prior to initiating the atomic sequence as shown in block 310.

At block 350, an augmented conditional storing operation is executed. The conditional storing operation may be augmented or defined as a new instruction in a given architecture. The conditional storing operation takes an indication of a register, e.g., 112, or memory address associated with a data word as an operand and is configured to store the data word in a memory location specified, e.g., provided in a second operand of the conditional storing operation. The data word may represent, for example, an output of a second instance of the base operation performed prior to initiating the atomic sequence as shown in block 320. The conditional storing operation is configured to check the allocated memory buffer 115, or specific portions of the allocated memory buffer 115, for any data stored therein. For example, if within the atomic sequence one or more regular storing operations were performed, e.g., as indicated in block 330, then one or more corresponding data words are already stored in the allocated memory buffer 115.

Upon detecting one or more data words stored within the memory buffer 115 the one or more data words detected and the data word, with corresponding address provided as operand to the conditional storing operation, are stored in two or more memory locations, e.g., 121a-121d. If instances of a base operations are performed prior to initiating the wide atomic sequence, as shown in blocks 310 and 320, the combination of the data words stored in memory by the conditional storing operation represents a result of a corresponding wide base operation. The instances of the base operations indicated in blocks 310 and 320 are optional. The wide atomic sequence represents an implementation of a wide memory operation, e.g., wide read or wide write operation. In storing the one or more data words detected in the memory buffer and the data word, with corresponding address provided as operand to the conditional storing operation, an address offset is used to indicate the offset between memory locations where the data words are to be stored in memory.

If no data is detected within the allocated memory buffer, then only the data word, with corresponding address provided as operand to the conditional storing operation, is stored in a the specified memory location. The atomic sequence is terminated once the conditional storing operation executes successfully. The conditional storing operation fails, i.e., fails to store one or more data words in the concatenation of the one or more memory locations, if the wide atomic sequence is interrupted before terminating. The wide atomic sequence described with respect to FIG. 3 may be viewed as a wide write atomic sequence configured to write wide words, e.g., wider than the data word width associated with processing unit 110, in the memory component 120.

In storing data in the allocated memory buffer, using regular storing operations within the atomic sequence, the same approach for defining addresses for the memory buffer 115 buffer, described with respect to FIG. 2, may also be employed in implementing the wide atomic sequence described in FIG. 3. That is, a number of LS bits, e.g., seven LS bits, of the address of the data word to be stored in the memory buffer 115 are used to indicate the bytes to be written in the memory buffer. Also, when the conditional storing operation succeeds, the processing unit 110 writes the data detected in the memory buffer 115 together with the data word provided as operand of the conditional storing operation to the concatenation of memory locations. The concatenation of memory locations is defined by a memory address provided as a second operand to the conditional storing operation and an address offset.

The instruction sequence below represents a wide atomic sequence as described in FIG. 3 for implementing a 128-bit memory operation in a hardware system supporting 64-bit computing, using the MIPS64 instruction set:

```
// assume $1 contains part of the (naturally-aligned)
// 128-bit address to store a 128-bit word
    $2 <- $1 & 0x7F    // 0x7f because the
// memory buffer is 128 bytes
AGAIN:
    $3 <- X
    $4 <- y
```

```
LLD $0, 0($1)
SD $3, CONSTANT($2)
SCD $4, 8($1)
BEQ $3, AGAIN
NOP
```

In the example above, the augmented LLD initiates the wide atomic sequence and allocates the memory buffer 115 but does not load a data word since its destination is the register $0. The 128-bit word to be stored, or written, in memory is the combination of x and y held, respectively, in registers $3 and $4. The SD instruction stores x in the allocated memory buffer. Upon executing the augmented SCD, x is stored in the memory address B indicated by register $1, while y is stored in the memory address B+8. The combination of x and y, as stored in the memory addresses B and B+8, form a 128-bit word. Therefore, the wide atomic sequence shown in the example above enables the hardware system 100 to support a wide memory operation, e.g., wide memory write.

The instruction sequence below represents a wide atomic sequence as described in FIG. 3 for implementing a 256-bit memory operation in a hardware system supporting 64-bit computing, using the MIPS64 instruction set:

```
// assume $1 contains part of the (naturally-aligned)
// 256-bit address to store a 256-bit word
   $2 <- $1 & 0x7F     // 0x7f because the
// memory buffer is 128 bytes
AGAIN:
   $3 <- x
   $4 <- y
   $5 <- w
   $6 <- z
   LLD $0, 0($1)
   SD $3, CONSTANT($2)
   SD $4, CONSTANT+8($2)
   SD $5, CONSTANT+16($2)
   SCD $6, 24($1)
   BEQ $3, AGAIN
   NOP
```

The wide atomic sequence described in the flowchart of FIG. 3 is different from the wide atomic sequence described in FIG. 2 in that the operation in block 330 has a register that consistently holds a static value, e.g., register $0, as destination, and, as such, does not load a data word and does not sample any data when initiating the atomic sequence for comparison at the end of the atomic sequence. Also, while the wide atomic sequence described in FIG. 2 includes at least one regular load operation or regular storing operation, the wide atomic sequence described in FIG. 3 includes at least one regular storing operation but no regular load operation. Furthermore, in the wide atomic sequence of FIG. 2, base operations are performed within the wide atomic sequence. However, in the wide atomic sequence of FIG. 3, base operations are performed prior to initiating the wide atomic sequence.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   initiating, by a processor, an atomic sequence by executing an operation designed to initiate the atomic sequence and allocate a memory buffer;
   storing one or more data words in a concatenation of one or more memory locations by executing a conditional storing operation, the conditional storing operation being designed to automatically check the memory buffer allocated for any data stored therein, and store the one or more data words based on a result of checking the memory buffer; wherein the operation designed to initiate the atomic sequence is a load operation designed to initiate the atomic sequence, and executing the load operation designed to initiate the atomic sequence includes loading a data word; and
   storing data in the memory buffer allocated by executing one or more regular storing operations within the atomic sequence, wherein storing one or more data words by executing a conditional storing operation includes:
   storing one or more first data words, associated with data stored in the memory buffer, and a second data word in a concatenation of two or more memory locations, the one or more first data words and the second data word having a cumulative width greater than a data word width associated with the processor.

2. The method as recited in claim 1 further comprising loading at least one data word by executing at least one regular load operation.

3. The method as recited in claim 1, wherein the one or more first data words, associated with data stored in the memory buffer, represent one or more outputs of one or more first instances of a base operation and the second data word represents an output of a second instance of the base operation, the one or more first data words and the second data word, as stored in the concatenation of the two or more memory locations, represent an output of a wide operation corresponding to the base operation.

4. The method as recited in claim 3 further comprising executing the one or more first instances of the base operation and the second instance of the base operation within the atomic sequence.

5. The method as recited in claim 1, wherein the operation designed to initiate the atomic sequence operates on a memory location residing within a single memory line.

6. The method as recited in claim 1, wherein any regular load operation or regular storing operation executed within the atomic sequence operates on a memory location residing within a single memory line.

7. A method comprising:
   initiating, by a processor, an atomic sequence by executing an operation designed to initiate the atomic sequence and allocate a memory buffer;
   storing one or more data words in a concatenation of one or more memory locations by executing a conditional storing operation, the conditional storing operation being designed to automatically check the memory buffer allocated for any data stored therein, and store the one or more data words based on a result of checking the memory buffer, wherein the operation designed to initiate the atomic sequence has a memory register carrying a static value as destination; and
   storing data in the memory buffer allocated by executing one or more regular storing operations within the atomic sequence, wherein storing one or more data words by executing a conditional storing operation includes:
   storing one or more first data words, associated with data stored in the memory buffer, and a second data word in a concatenation of two or more memory locations, the one or more first data words and the second data word having a cumulative width greater than a data word width associated with the processor.

8. The method as recited in claim 7, wherein the one or more first data words, associated with data stored in the memory buffer, represent one or more outputs of one or more first instances of a base operation and the second data word represents an output of a second instance of the base operation, the one or more data first words and the second data word as stored in the concatenation of the two or more memory locations represent an output of a wide operation corresponding to the base operation.

9. The method as recited in claim 8 further comprising executing the one or more first instances of the base operation and the second instance of the base operation prior to initiating the atomic sequence.

10. The method as recited in claim 7, wherein the operation designed to initiate the atomic sequence operates on a memory location residing within a single memory line.

11. The method as recited in claim 7, wherein any regular load operation or regular storing operation executed within the atomic sequence operates on a memory location residing within a single memory line.

12. A processor device comprising:
a core processor; and
a memory buffer associated with the core processor,
the core processor being configured to:
initiate an atomic sequence by executing an operation designed to initiate the atomic sequence and allocate a memory buffer;
store one or more data words in a concatenation of one or more memory locations by executing a conditional storing operation, the conditional storing operation being designed to automatically check the memory buffer allocated for any data stored therein, and store the one or more data words based on a result of checking the memory buffer, wherein the operation designed to initiate the atomic sequence is a load operation designed to initiate the atomic sequence, and in executing the load operation designed to initiate the atomic sequence, the core processor is further configured to load a data word; and
store data in the memory buffer allocated by executing one or more regular storing operations within the atomic sequence, wherein in storing the one or more data; words by executing a conditional storing operation, the core processor is further configured to store one or more first data words, associated with data stored in the memory buffer, and a second data word in a concatenation of two or more memory locations, the one or more first data words and the second data word having a cumulative width greater than a data word width associated with the processor.

13. The processor device as recited in claim 12, wherein the core processor is further configured to load at least one data word by executing at least one regular load operation.

14. The processor device as recited in claim 12, wherein the one or more first data words, associated with data stored in the memory buffer, represent one or more outputs of one or more first instances of a base operation and the second data word represents an output of a second instance of the base operation, the one or more first data words and the second data word, as stored in the concatenation of the two or more memory locations, represent an output of a wide operation corresponding to the base operation.

15. The processor device as recited in claim 14, the core processor is further configured to execute the one or more first instances of the base operation and the second instance of the base operation within the atomic sequence.

16. The processor device as recited in claim 12, wherein the operation designed to initiate the atomic sequence operates on a memory location residing within a single memory line.

17. The processor device as recited in claim 12, wherein any regular load operation or regular storing operation executed within the atomic sequence operates on a memory location residing within a single memory line.

18. A processor device comprising:
a core processor; and
a memory buffer associated with the core processor,
the core processor being configured to:
initiate an atomic sequence by executing an operation designed to initiate the atomic sequence and allocate a memory buffer;
store one or more data words in a concatenation of one or more memory locations by executing a conditional storing operation, the conditional storing operation being designed to automatically check the memory buffer allocated for any data stored therein, and store the one or more data words based on a result of checking the memory buffer, wherein the operation designed to initiate the atomic sequence has a memory register carrying a static value as destination; and
store data in the memory buffer allocated by executing one or more regular storing operations within the atomic sequence, wherein in storing the one or more data words by executing a conditional storing operation, the core processor is further configured to store one or more first data words, associated with data stored in the memory buffer, and a second data word in a concatenation of two or more memory locations, the one or more first data words and the second data word having a cumulative width greater than a data word width associated with the processor.

19. The processor device as recited in claim 18, wherein the one or more first data words, associated with data stored in the memory buffer, represent one or more outputs of one or more first instances of a base operation and the second data word represents an output of a second instance of the base operation, the one or more data first words and the second data word as stored in the concatenation of the two or more memory locations represent an output of a wide operation corresponding to the base operation.

20. The processor device as recited in claim 18, wherein the core processor is further configured to execute the one or more first instances of the base operation and the second instance of the base operation prior to initiating the atomic sequence.

21. The processor device as recited in claim 18, wherein the operation designed to initiate the atomic sequence operates on a memory location residing within a single memory line.

22. The processor device as recited in claim 18, wherein any regular load operation or regular storing operation executed within the atomic sequence operates on a memory location residing within a single memory line.

* * * * *

UNITED STATES PATENT AND TRADEMARK OFFICE
CERTIFICATE OF CORRECTION

PATENT NO. : 9,501,243 B2
APPLICATION NO. : 14/045602
DATED : November 22, 2016
INVENTOR(S) : Richard E. Kessler, Michael S. Bertone and Christopher J. Comis Page 1 of 1

It is certified that error appears in the above-identified patent and that said Letters Patent is hereby corrected as shown below:

In the Claims

Column 14, Claim 19, Line 47 delete "more data first" and insert -- more first data --.

Signed and Sealed this
Twenty-eighth Day of February, 2017

Michelle K. Lee
*Director of the United States Patent and Trademark Office*